US008229896B1

(12) United States Patent
Narayanan

(10) Patent No.: US 8,229,896 B1
(45) Date of Patent: Jul. 24, 2012

(54) METHOD AND APPARATUS FOR IDENTIFYING DATA BLOCKS REQUIRED FOR RESTORATION

(75) Inventor: Priyesh Narayanan, Kerala (IN)

(73) Assignee: Symantec Corporation, Mountain View, CA (US)

( * ) Notice: Subject to any disclaimer, the term of this patent is extended or adjusted under 35 U.S.C. 154(b) by 410 days.

(21) Appl. No.: 12/164,313

(22) Filed: Jun. 30, 2008

(51) Int. Cl.
*G06F 17/30* (2006.01)
*G06F 17/00* (2006.01)

(52) U.S. Cl. ........................................ 707/674; 707/686

(58) Field of Classification Search .................. 707/638, 707/626, 646, 754, 682, 674, 686
See application file for complete search history.

(56) References Cited

U.S. PATENT DOCUMENTS

| | | | | |
|---|---|---|---|---|
| 5,021,974 | A * | 6/1991 | Pisculli et al. | 345/467 |
| 7,650,533 | B1 * | 1/2010 | Saxena et al. | 714/6.12 |
| 7,725,704 | B1 * | 5/2010 | Beaverson et al. | 713/2 |
| 2004/0139128 | A1 * | 7/2004 | Becker et al. | 707/204 |
| 2005/0240813 | A1 * | 10/2005 | Okada et al. | 714/14 |
| 2007/0088924 | A1 * | 4/2007 | Jean-Denis et al. | 711/162 |

* cited by examiner

*Primary Examiner* — Charles Rones
*Assistant Examiner* — Fariborz Khoshnoodi
(74) *Attorney, Agent, or Firm* — Campbell Stephenson LLP

(57) ABSTRACT

A method and apparatus for recovering a volume to a first recovery point using bitmap information is described. In one embodiment, the method comprises processing bitmap information associated with at least one recovery point, wherein the bitmap information comprises at least one bitmap that represents at least one changed block since a first recovery point of the at least one recovery point, wherein the first recovery point is associated with a backup image and restoring the at least one changed block from the backup image to a volume.

20 Claims, 3 Drawing Sheets

100

CLIENT SUB SYSTEM 102
VOLUME 110
BACKUP COMPUTER 104
CPU
112
SUPPORT CIRCUITS
114
MEMORY 116
BITMAP INFORMATION 118
BACKUP MODULE 120
FILTER DRIVER 122
NETWORK 108
STORAGE CLIENT SUBSYSTEM 106
BACKUP IMAGES 124

METHOD AND APPARATUS FOR IDENTIFYING DATA BLOCKS REQUIRED FOR RESTORATION

BACKGROUND OF THE INVENTION

1. Field of the Invention

Embodiments of the present invention generally relate to data backup and restoration techniques and, more particularly, to a method and apparatus for efficiently identifying and restoring data blocks which require to be restored in a recovery system.

2. Description of the Related Art

Currently, data is backed up to and restored from computer storage in order to provide protection from data loss if the original data becomes corrupted or damaged due to various reasons, such as a component failure (like hardware or software failure), a natural disaster, or other technical disaster (such as virus attacks). The recovery of such data involves number of operations for restoring the data blocks to a volume.

In addition, some conventional techniques, such as snapshot-based backup techniques, take a snapshot and then, back up the data blocks. The snapshot is created at a predetermined point-in-time. Snapshots are generally created on some regular schedule. The snapshot is stored on-disk along with the active file system, and is called into the buffer cache of the filer memory as requested by the storage operating system. These techniques, generally, are more complex to implement and take more time for data restoration.

Furthermore, the recovery process restores data blocks that are already in the volume. The conventional techniques are not that efficient as the data blocks which are not changed from a recovery point are also restored. Hence, the conventional techniques restore duplicate and unchanged data blocks to the volume and hence, these conventional techniques are inadequate for allowing speedy restoration of the data.

Therefore, there is a need in the art for a method and apparatus for efficiently identifying data blocks required for restoration.

SUMMARY OF THE INVENTION

Embodiments of the present invention generally comprise a method and apparatus for identifying data blocks required for restoration. In one embodiment, a method for recovering the volume to a first recovery point using bitmap information comprises processing bitmap information associated with at least one recovery point, wherein the bitmap information comprises at least one bitmap that represents at least one changed block since a first recovery point of the at least one recovery point, wherein the first recovery point is associated with a backup image and restoring the at least one changed block from the backup image to a volume.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
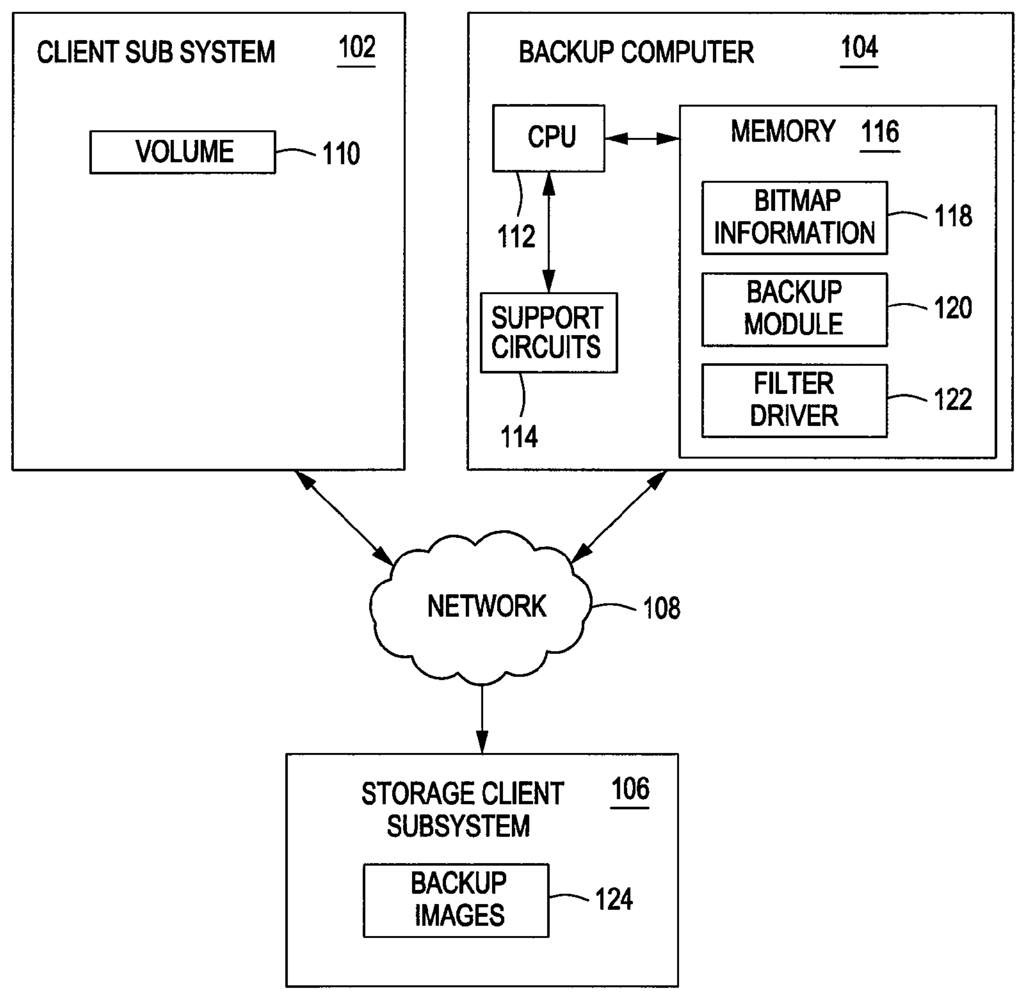
FIG. 1 is a block diagram of a system for recovering a volume using bitmap information according to one embodiment of the present invention.

FIG. 1 is a block diagram of a system 100 for recovering a volume using bitmap information according to one embodiment of the present invention. The system 100 includes a client subsystem 102, a backup computer 104, and a storage subsystem 106, each coupled to each other through a network 108.

Generally, the client subsystem 102 comprises various computing devices, such as desktop computers, laptops, mobile computing devices (e.g., mobile phones and Personal Digital Assistants (PDAs)), and/or the like. The client subsystem 102 further comprises a volume 110, which includes data that is utilized by the various computing devices, such as application data, graphics files, financial data, audio/visual files and/or the like. The volume 110 may also be stored locally (e.g., at a client computer) or remotely (e.g., in the storage subsystem 106).

The backup computer 104 comprises a Central Processing Unit CPU 112, support circuits 114, and a memory 116. The CPU 112 comprises one or more commercially available microprocessors or microcontrollers. Alternatively, the CPU 112 may include one or more Application Specific Integrated Circuits, also known as ASIC. The various support circuits 114 facilitate the operation of the CPU 112 and includes one or more clock circuits, buses, power supplies, network cards and/or the like. The memory 116 further includes a bitmap information 118, a backup module 120, and a filter driver 122. The memory 116 includes Read Only Memory (ROM), Random Access Memory (RAM), Electrically Erasable Programmable Read Only Memory (EEPROM), Flash memory, magnetic storage, a removable storage memory and/or the like.

The storage subsystem 106 includes various data storage devices, such as optical storage drives (CD, DVD), magnetic tape drives, hard disk drives, storage arrays (e.g., a RAID configuration) and/or other non-transitory computer-readable storage media. The storage subsystem 106 may form a portion of a Storage Area Network (SAN). The storage subsystem 106 also includes backup images 124 for storing backup copies of the volume 110 at various recovery points (i.e., points in time).

The network 108 comprises a communication system that connects a computer system by wire, cable, fiber optic and/or wireless link facilitated by various types of well-known network elements, such as hubs, switches, routers, and the like. The network 108 may further employ various well-known protocols to communicate information amongst the network resources. For example, the network 108 may be a part of the Internet or Intranet using various communications infrastructure, such as Ethernet, WiFi, WiMax, General Packet Radio Service (GPRS) and the like. The network 106 may be a part of a Storage Area Network (SAN) using various data storage infrastructure, such as Fibre Channel, iSCSI and/or the like.

According to various embodiments of the present invention, the filter driver 122 generates the bitmap information 118 associated with one or more recovery points. In an embodiment, the bitmap information 118 comprises one or more bitmaps that represent at least one changed block since a first recovery point of the one or more recovery points. The first recovery point is associated with the backup image 124 in the storage subsystem 106. The filter driver 122 communicates with the backup module 120 whenever there is some change in the blocks. Alternately, the filter driver 122 updates the bitmap information 118. In one embodiment, the filter driver 122 examines the bitmap information 118 to identify one or more inconsistent data block. In another embodiment, the filter driver 122 utilizes one or more inconsistent data block to updates the backup image 124.

According to various embodiments of the present invention, the backup module 120 performs a backup process. The backup module 120 accesses volumes or copies these volumes and backed up these volumes. The backup module 120 restores the at least one changed block from the backup image 124 to the volume 110. The backup module 120 may be a software package or a software application. In an embodiment, the backup module 120 is a piece of software program which is able to access the volume 110 through the network 108 and copying one or more data blocks to the backup images 124 in the storage subsystem 106. According to various embodiments of the present invention, the backup images 124 includes one or more copies of the data blocks that are backed up from the volume at one or more recovery points. In one embodiment, the backup image 124 includes one or more inconsistent data blocks.

According to various embodiments of the present invention, the bitmap information 118 is an array of binary bits. The bitmap information 120 is a table with an address mapped to a bit that is set if the data block associated with the address changes during the recovery window. If in an array, a bit is set at a particular address, then that address (location) is changed. In one embodiment, the bitmap information 118 is maintained that tracks the data blocks that have changed since the first recovery point of the at least one recovery point. In another embodiment, the bitmap information 118 indicates one or more inconsistent data block.

For example, the volume 110 may be backed up at recovery points T1-T7 along with corresponding change tracking bitmaps M1-M7. A system administrator may desire to recover the volume 110 to recovery point T3. The procedure for identifying the data blocks required for restoring the volume 110 at time T7 may start by blocking the volume 110 (i.e., a primary volume) for writing. In one embodiment, the bitmap M1-M7 are stored as the bitmap information 118 in the backup computer 104. Subsequently, the backup module 120 examines the bitmaps M4-M7, which correspond to all the backups taken after the recovery point T3. Specifically, the bitmaps M4, M5, M6 and M7 correspond to the recovery points T4, T5, T6 and T7, respectively.

The filter driver 122 performs a logical-OR operation on the bitmaps M4-M7 to create a recovery bitmap M that represents the data blocks that have changed from the recovery point T3 to the current recovery point T7. Mathematically, the above operation is represented as "M=Logical-OR (M4, M5, M6, M7)." At this moment, only the data blocks indicated by the recovery bitmap M are restored because the other data blocks were not changed during the recovery window. In general, various embodiments of the present invention identify one or more data blocks that have changed since the recovery point for which recovery is sought, so that only the one or more data blocks are restored into the primary volume. Hence, the recovery window is minimized because unchanged data blocks are not restored to the primary volume.

In one or more embodiments of the present invention, the recovery bitmap M may be a table with an address mapped to a bit that is set if the data block associated with the address has been changed within the recovery window. With information indicating which data blocks are changed since a recovery point, the backup module 120 is able to restore only those data blocks which are changed. Hence, the backup module 120 does not restore any duplicative or unchanged data blocks. As a result, numerous processing and storage resources are freed to perform other tasks and also the restoration time is greatly reduced. Alternatively, the invention may compare fingerprints associated with a primary volume and a recovery point to identify one or more data blocks that changed within a recovery window.

Figure 2:
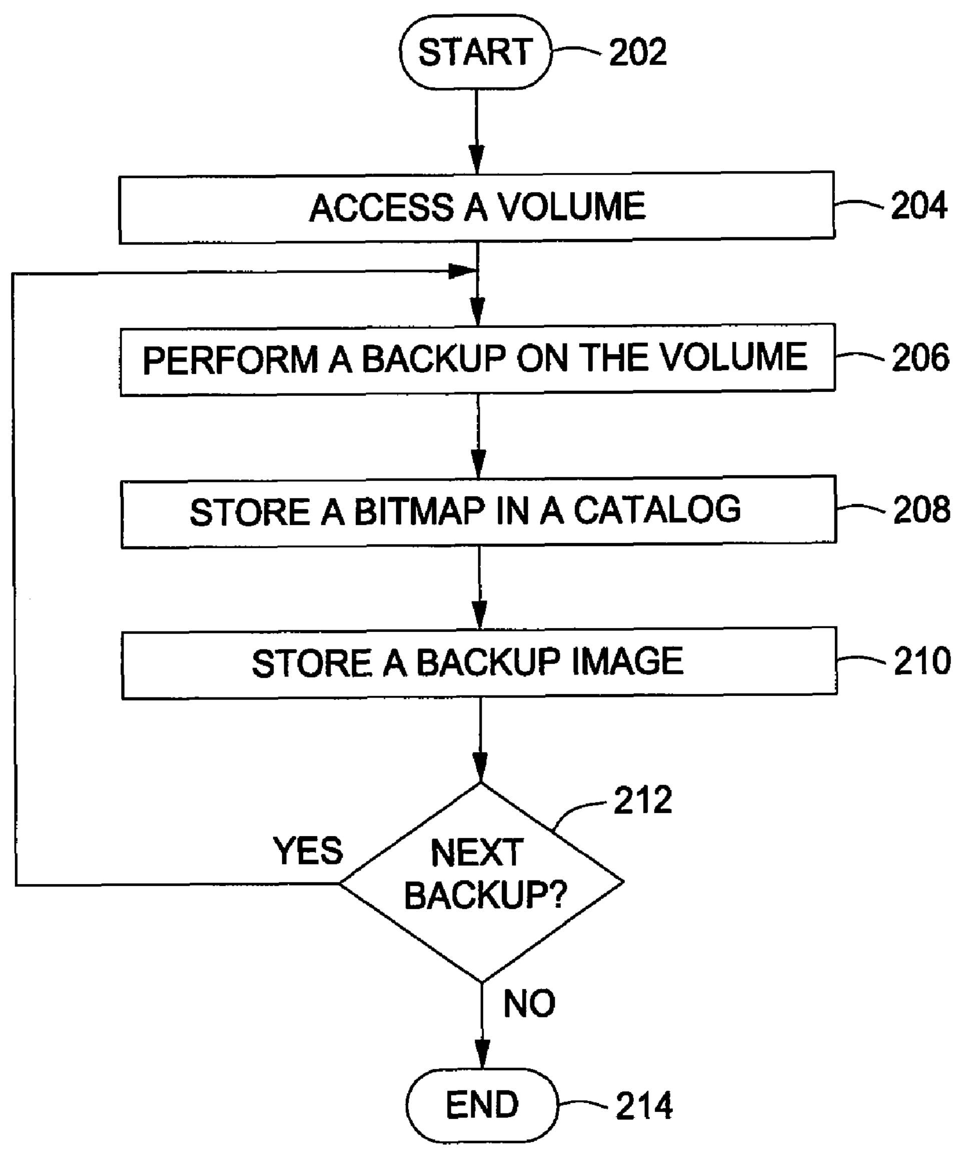
FIG. 2 is a flow diagram of a method for generating bitmap information during at least one backup process according to one embodiment of the present invention.

FIG. 2 is a flow diagram of a method 200 for generating bitmap information during at least one backup process according to one embodiment of the present invention. The method 200 starts at step 202 and proceeds to step 204.

At step 204, a volume, (e.g., the volume 110) is accessed. At step 206, a backup is performed on the volume, (e.g., the volume 110) by the backup module (e.g., the backup module 120). At step 208, a bitmap is stored in a catalog. In an embodiment of the present invention, the bitmap information 118 is a portion of the catalog. At step 210, a backup image is stored. At step 212, a determination is made as to whether a next backup is to be performed. If the next backup is to be performed (option "YES"), the method 200 returns to the step 206. If the next backup is not to be performed (option "NO"), the method 200 proceeds to step 214. At step 214, the method 200 ends.

Figure 3:
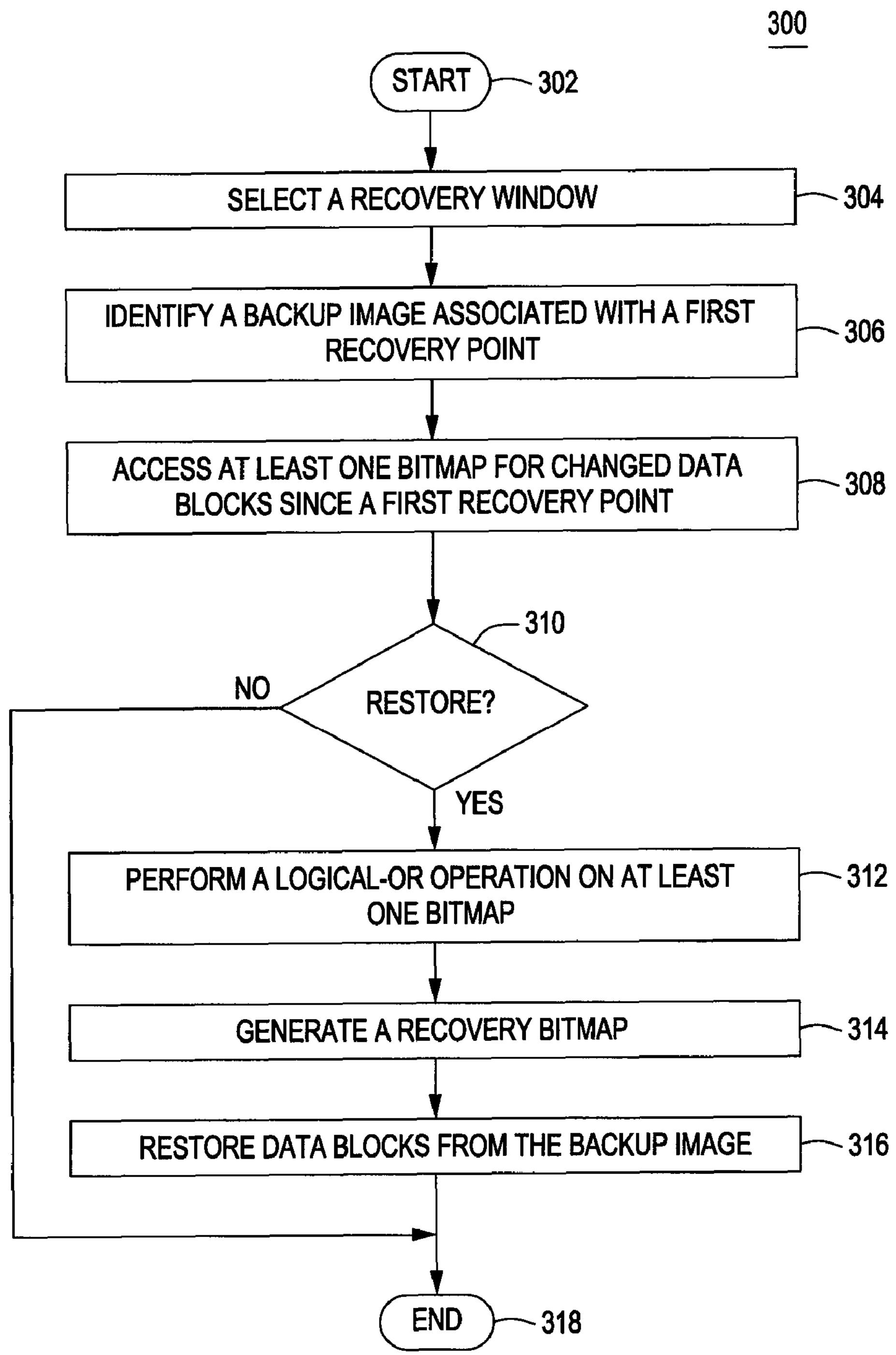
FIG. 3 is a flow diagram of a method for recovering a volume using bitmap information according to one embodiment of the present invention.

FIG. 3 is a flow diagram of a method 300 for recovering a volume using bitmap information according to one embodiment of the present invention. The method 300 starts at step 302 and proceeds to step 304.

At step 304, a recovery window is selected. At step 306, a backup images (i.e. the backup image 124) associated with a first recovery point is identified. At step 308, one or more bitmaps (e.g., the bitmap information 118) for changed data blocks since the first recovery point is accessed. At step 310, a determination is made as to whether there data blocks are to be restored. If the data blocks are to be restored (option "YES"), the method 300 proceeds to step 312. If the data blocks are not to be restored (option "NO"), the method 300 ends at step 318. At step 312, a logical OR operation is performed on the one or more bitmaps bitmap. In other embodiments, other logical operations may also be performed on the one or more bitmaps. At step 314, a recovery bitmap is generated from the one or more bitmaps. At step 316, the data blocks from the backup image (e.g., the backup image 124) are restored. The method 300 ends at step 318.

The embodiments of the present invention offer various advantages. The embodiments of the present invention efficiently identify and restore the modified or changed data blocks and thereby reduce the significant restoration time. Further the various embodiments, avoid restoration of unnecessary and duplicate data blocks and hence various processing and storage resources are free for other tasks. Further the various embodiments can be utilized for restoring data from human or logical errors scenarios.

While the foregoing is directed to embodiments of the present invention, other and further embodiments of the invention may be devised without departing from the basic scope thereof, and the scope thereof is determined by the claims that follow.

The invention claimed is:

1. A method comprising:

processing bitmap information, wherein the bitmap information comprises at least two bitmaps, the at least two bitmaps comprise a first bitmap and a second bitmap, the first bitmap corresponds to a second recovery point, the first bitmap represents a plurality of blocks changed since a first recovery point, the second bitmap corresponds to a third recovery point, the second bitmap represents a plurality of blocks changed since the second recovery point, the first recovery point is associated with a full backup image, and the full backup image is a backup image of a volume; and in response to a request to restore the full backup image, restoring a portion of the full backup image, wherein the portion of the full backup image is an amount of backup data less than an amount of backup data in the full backup image, the at least two bitmaps information identify one or more blocks of the volume, the one or more blocks have changed since the first recovery point, and the restoring restores only the one or more blocks from the full backup image.

2. The method of claim 1, comprising:

backing up the volume at a recovery point among the recovery points subsequent to the first recovery point;

generating a backup image that represents the volume at the recovery point; and generating a bitmap that represents at least one changed block since a previous recovery point.

3. The method of claim 1, wherein:

the restoring comprises generating a recovery bitmap, the recovery bitmap is based at least in part on a logical-OR operation performed on the at least two bitmaps, and the recovery bitmap indicates the one or more blocks.

4. The method of claim 3, wherein the restoring comprises copying the one or more blocks from the backup image to the volume based at least in part on the recovery bitmap.

5. The method of claim 1, wherein:

the second recovery point is associated with a second full backup image;

the second full backup image is a backup image of the volume; and the restoring comprises identifying the one or more blocks based at least in part on a logical-OR operation applied to the first bitmap, and the second bitmap.

6. The method of claim 1, wherein the processing the bitmap information comprises selecting the first recovery point to start a recovery process for the volume.

7. The method of claim 1, wherein the processing the bitmap information comprises identifying the backup image associated with the first recovery point.

8. A non-transitory computer-readable storage medium storing program instructions executable to:

process bitmap information wherein the bitmap information comprises at least two bitmaps, the at least two bitmaps comprise a first bitmap and a second bitmap, the first bitmap corresponds to a second recovery point, the first bitmap represents a plurality of blocks changed since a first recovery point, the second bitmap corresponds to a third recovery point, the second bitmap represents a plurality of blocks changed since the second recovery point, the first recovery point is associated with a full backup image, and the full backup image is a backup image of a volume; and restore a portion of the full backup image, in response to a request to restore the full backup image, wherein the portion of the full backup image is an amount of backup data less than an amount of backup data in the full backup image, the at least two bitmaps identify one or more blocks of the volume, the one or more blocks have changed since the first recovery point, and the program instructions are executable to restore only the one or more blocks from the full backup image.

9. The non-transitory computer-readable storage medium of claim 8, wherein the program instructions are executable to:

generate a recovery bitmap, wherein the recovery bitmap is based at least in part on a logical-OR operation performed on the at least two bitmaps, and the recovery bitmap indicates the one or more blocks.

10. The non-transitory computer-readable storage medium of claim 9, wherein the program instructions are executable to:

copy the one or more blocks from the full backup image to the volume.

11. The non-transitory computer-readable storage medium of claim 8, wherein the program instructions are executable to:

identify the one or more blocks based at least in part on an examination of the at least two bitmaps.

12. The non-transitory computer-readable storage medium of claim 8, wherein the program instructions are executable to:

identify the full backup image associated with the first recovery point.

13. The non-transitory computer-readable storage medium of claim 8, wherein the program instructions are executable to:

perform a backup process on the volume at the first recovery point, and generate the full backup image representing the volume at the first recovery point.

14. The non-transitory computer-readable storage medium of claim 8, wherein the program instructions are executable to:

generate a bitmap that represents at least one changed block since a previous recovery point.

15. A system comprising:

a client subsystem comprising a volume;

a storage subsystem comprising at least one full backup image associated with at least one recovery point; and a backup computer comprising a filter driver configured for generating bitmap information associated with at least two recovery points, wherein the bitmap information comprises at least two bitmaps, the at least two bitmaps comprise a first bitmap and a second bitmap, the first bitmap corresponds to a second recovery point, the first bitmap represents a plurality of blocks changed since a first recovery point, the second bitmap corresponds to a third recovery point, the second bitmap represents a plurality of blocks changed since the second recovery point, the first recovery point is associated with a full backup image of the at least one backup image, and the full backup image is a backup image of the volume, and a backup module configured for restoring a portion of the full backup image, in response to a request to restore the full backup image, wherein the portion of the full backup image is an amount of backup data less than an amount of backup data in the full backup image, the at least two bitmaps identify one or more blocks of the volume, the one or more blocks have changed since the first recovery point, and the restoring uses the bitmap information to restore only the one or more blocks from the full backup image.

16. The system of claim 15, wherein:

the filter driver is configured to generate a recovery bitmap based at least in part on a logical-OR operation performed on the at least two bitmaps, and the recovery bitmap indicates the one or more blocks.

17. The system of claim 16, wherein the backup module is configured to copy the one or more blocks from the full backup image to the volume based at least in part on the recovery bitmap.

18. The system of claim 15, wherein the backup module is configured to identify the full backup image associated with the first recovery point.

19. The system of claim 15, wherein the backup module is configured to:

perform a backup process on the volume at the first recovery point, and generate the full backup image that represents the volume at the first recovery point.

20. The system of claim 19, wherein the backup module is configured to generate a bitmap that represents at least one changed block since a previous recovery point.

* * * * *

UNITED STATES PATENT AND TRADEMARK OFFICE

CERTIFICATE OF CORRECTION

PATENT NO. : 8,229,896 B1
APPLICATION NO. : 12/164313
DATED : July 24, 2012
INVENTOR(S) : Priyesh Narayanan It is certified that error appears in the above-identified patent and that said Letters Patent is hereby corrected as shown below:

In Claim 1, Column 5, line 19, please delete the word “information” after the word “bitmaps” and before the word “identify”.

Signed and Sealed this
Twenty-third Day of October, 2012

David J. Kappos
*Director of the United States Patent and Trademark Office*